Dec. 31, 1946.  W. B. FREEMAN ET AL  2,413,445
TIRE BUILDING FORM
Filed June 9, 1944
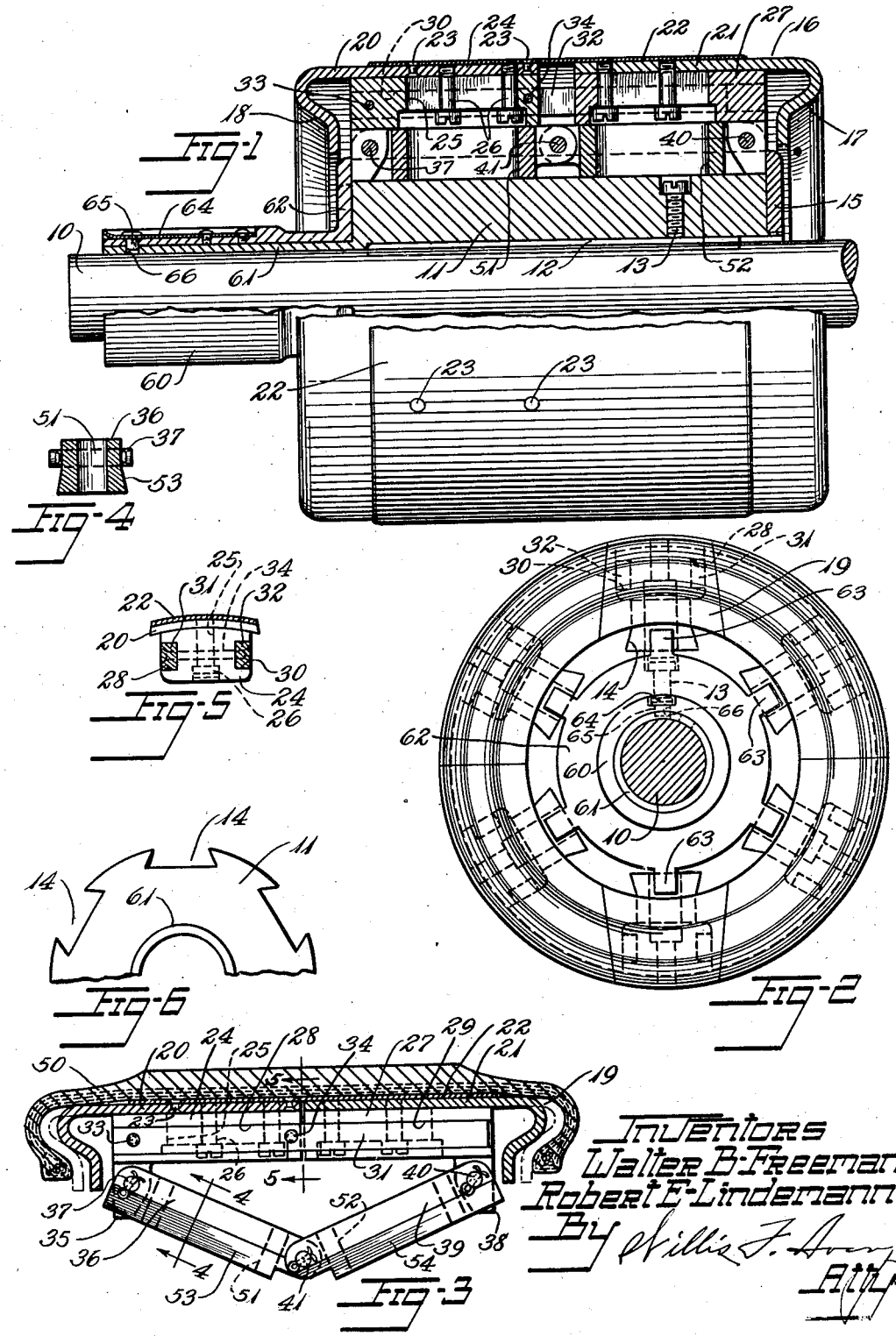
Inventors
Walter B. Freeman
Robert E. Lindemann
By Willis F. Avery
Atty.

Patented Dec. 31, 1946

2,413,445

UNITED STATES PATENT OFFICE 2,413,445

TIRE BUILDING FORM

Walter B. Freeman, Cuyahoga Falls, and Robert E. Lindemann, Barberton, Ohio, assignors to The B. F. Goodrich Company, New York, N. Y., a corporation of New York Application June 9, 1944, Serial No. 539,570

9 Claims. (Cl. 154—9)

This invention relates to tire building forms and more particularly to drums having undercut sides suitable especially for building tire casings of small bead diameter.

In the building of tire casings of small bead diameter it has been found desirable to construct the form in sections assembled about a central supporting body and to remove them in succession from the finished tire after the sections as a group have been removed axially of the supporting body with the casing.

Where it is necessary to build the tire with the bead portions set closer together than the side walls, removal of the sections radially of the tire in prior building forms has been extremely difficult.

It is an object of the present invention to provide effectively for removal of form sections from tires built on undercut drums of small diameter.

Other objects of the invention are to provide for reducing the dimensions of a form for removal while providing a rigid structure on which the tire may be built, to provide a single structure of the undercut drum type which may be used for building tires of different widths, to provide for rapid assembly and disassembly, to provide for momentarily reducing the width of the drum segments to permit removal from the tire without distortion of the tire, and to provide for locking the segments at their set width when assembled with other parts of the drum.

These and other objects will appear from the following description and the accompanying drawing.

Of the drawing:

Fig. 1 is an axial sectional view showing the drum assembled about a driving shaft, Fig. 2 is an end view thereof, the shaft being shown in section, Fig. 3 is a detail sectional view showing one of the segments and the tire thereon, the segment being shown in its collapsed position, Fig. 4 is a detail sectional view taken on line 4—4 of Fig. 3, Fig. 5 is a detail sectional view, taken on line 5—5 of Fig. 3, and Fig. 6 is an end view of a portion of the drum supporting body, parts being broken away.

Referring to the drawing, the numeral 10 designates a drive-shaft of a tire-building machine which is adapted to be rotated by the machine. Fixed to the shaft is a sleeve 11, or supporting body, which may be removably secured thereto as by a key 12 and set screw 13. The body 11 is formed with guide means such as a multiplicity of dovetail segment-retaining slots 14 extending axially thereof in spaced-apart relation. A collar 15 at the inboard end of the body is secured to the body and blocks the slots at that end.

Removably mounted about the body is a sectional tire building form 16 having a cylindrical outer face and undercut end faces 17, 18. This form is made of segments 19 some of which are wider at the base to permit removal radially inward of a tire casing in advance of others, as can be seen in Fig. 2.

Each segment is adjustable axially to provide for building tires of different width and is also adapted to be shortened in width momentarily to permit its withdrawal from the finished tire casing. For this purpose each form segment is constructed of a plurality of elements movable with relation to each other when the segment is removed from the body 11 but immovable with relation to each other when entered in one of the slots 14 of the body 11. As the construction of each segment as to the supporting mechanism is the same, only one will be described.

Referring to Figs. 3, 4 and 5 especially, a form segment 19 comprises laterally separated side elements 20, 21 of sheet metal, and an overlapping central element 22 secured by rivets 23 to element 20 and slideable over element 21 to provide a laterally adjustable unbroken building surface. Segment element 20 is adjustably mounted on a block 24, having a longitudinal slot 25 therethrough, by screws 26 passing through the slots and threaded into the segment element. Segment element 21 is similarly adjustably mounted on a block 27. These blocks are formed along one side with aligned grooves 28, 29 and along their opposite sides with similar grooves, such as 30. A pair of guide rails 31, 32 are located in these grooves and are fixed to block 24, as by rivets 33, 34 passing therethrough while block 27 is slideable with relation to the rails.

Block 24 has a depending hinge lug 35 by which it is hinged to a toggle member 36, as by a hinge pin 37. A similar lug 38 on block 27 is hinged to a second toggle member 39 by a pin 40. Toggle members 36 and 39 are hinged to each other by a pin 41. The arrangement is such that when pin 41 is moved from the position of Fig. 3 toward the blocks, blocks 24, 27 are moved apart to the position they occupy in Fig. 1 moving the segment elements 20, 21 apart, and when the pin 41 is moved in the opposite direction, the blocks are moved toward each other carrying with them the segment elements 20, 21 and permitting removal of the segment radially from the tire 50, The toggle members 36, 39 are formed with clearance slots 51, 52 therethrough opposite the slots in blocks 24, 27 to permit tightening or loosening of screws 26 so that segment elements 20, 21 may be adjusted along the blocks to change their position for tires of different widths.

To secure the segments in the slots 14 of the body 11 and also to lock the toggle mechanism during the building of a tire, toggle members 36, 39 are formed with dovetailed portions 53, 54 whereby they may be slid along the groove 14 when aligned with each other.

For retaining all of the segments in place a collar 60 is rotatably mounted over a reduced portion 61 of body 11 and has an outwardly directed flange 62 having a plurality of fingers 63 which in one rotative position of the collar, as shown in Fig. 1, obstructs movement of the dovetailed toggle members from the slots and locks them in place. A spring 64 holds the collar in this position by forcing a pin 65 through a hole 66 in the collar and a corresponding hole in the reduced portion 61 of the body 11. By lifting the pin 65, the collar 60 may be rotated to a position where the fingers 63 clear the slots 14.

The operation of the apparatus is as follows: With the toggle members flattened against the supporting blocks, the segments are slid into place axially of the body 11 along the slots 14. The collar 60 is then turned to lock the segments in place. A tire 50 is then built about the drum. When the tire is completed, the collar 60 is turned to a non-locking position, and the segments with the tire thereon are removed as a unit axially of the body 11. Then the segments are removed from the tire, one at a time, the key sections first, by moving their toggle members radially inward of the tire and thereby temporarily shortening the segments so that they may be conveniently removed past the bead portions of the tire. Then the toggles are flattened, the segments replaced in the slots 14 and the drum is ready for building another tire. Where a tire of different width is to be built, the screws 26 are loosened, the segment elements 20, 21 adjusted to the new dimension, and the screws tightened before replacing the segments.

Variations may be made without departing from the scope of the invention as it is defined by the following claims.

We claim:

1. A tire building drum comprising a plurality of circumferentially arranged drum segments each segment comprising laterally separable side elements, means engageable with said segments for holding them in assembled relation, said segments being disengageable as a group from said means by movement axially thereof, and quick-acting collapsing means individual to a segment including a member on one side element of the segment movably engaging a member on the other side element of the segment for temporarily reducing its width to facilitate its removal from a tire.

2. An undercut tire-building drum comprising a plurality of circumferentially arranged drum segments, each segment comprising laterally separable side elements having undercut side faces, means engageable with said segments for holding them in assembled relation, said segments being disengageable as a group from said means by movement axially thereof, and quick-acting collapsing means individual to a segment and hinged to both side elements thereof for temporarily reducing its width to facilitate its removal from a tire.

3. An undercut tire-building drum comprising a plurality of circumferentially arranged drum segments, each segment comprising laterally separable side elements having undercut side faces, a body having axially extending guide means for slideably retaining each segment, said segments being removable as a group from said body by lateral movement axially thereof, and quick-acting collapsing means individual to a segment including toggle means mounted on the side elements of the segment for temporarily reducing its width to facilitate its removal from a tire.

4. An undercut tire-building drum comprising a plurality of circumferentially arranged drum segments, each segment comprising laterally separable side elements having undercut side faces, a body having axially extending guide means for slideably retaining each segment, said segments being removable as a group from said body by lateral movement axially thereof, and quick-acting collapsing means individual to a segment and hinged to both side elements thereof for temporarily reducing its width to facilitate its removal from a tire, said guide means including means for locking said collapsing means against axial movement with relation thereto when said segments are in place on said body.

5. An undercut tire building drum comprising a plurality of circumferentially arranged drum segments, the segments comprising laterally separable side elements having undercut side faces, a body having axially extending guide means for slideably retaining the segments, said segments being removable as a group from said body by lateral movement axially thereof, and toggle means associated with the segments for reducing the width thereof by movement of the elements toward each other to facilitate removal from a tire.

6. An undercut tire building drum comprising a plurality of circumferentially arranged drum segments, each segment comprising laterally separable side elements movable toward and from each other and guide means for keeping said elements in alignment during such movement, a body having axially extending guide means for retaining the segments, said segments being removable as a group laterally of said body by sliding movement, and toggle means associated with the segments for reducing the width thereof to facilitate removal from a tire.

7. An undercut tire building drum comprising a plurality of circumferentially arranged drum segments, each segment comprising laterally separable side elements movable toward and from each other and guide means for keeping said elements in alignment during such movement, a body having axially extending guide means for retaining each segment, said segments being removable as a group laterally of said body by sliding movement, and toggle means associated with each segment for temporarily reducing its width to remove it from a tire, said toggle means being arranged to engage the guide means of said body when the segment is in place thereon to lock said toggle means against toggle movement.

8. An undercut tire building drum comprising a plurality of circumferentially arranged drum segments, each segment comprising laterally separable side elements movable toward and from each other and guide means for keeping said elements in alignment during such movement, a body having axially extending guide means for retaining each segment, said segments being removable as a group laterally of said body by sliding movement, and toggle means associated with each segment for temporarily reducing its width to remove it from a tire, said toggle means comprising a pair of toggle elements hinged to each other and to said segment elements, and means on said toggle elements for slideably engaging the guide means of said body to hold said toggle elements in alignment with each other when the segment is on said body.

9. A tire building apparatus comprising a collapsible tire building form adapted to be mounted upon and driven by an axially grooved support, said form comprising segments axially removable from grooves of said support, each segment having a plurality of shell sections relatively movable with respect to each other in the axial direction, and interlocking means disposed radially within a segment and axially removable from the support therewith, said interlocking means comprising a toggle linkage interconnecting axially opposed sections of a segment.

WALTER B. FREEMAN.
ROBERT E. LINDEMANN.